(12) United States Patent  (10) Patent No.: US 8,125,683 B2
Miyazawa et al.  (45) Date of Patent: Feb. 28, 2012

(54) IMAGE PREVIEW PROCESSING APPARATUS, IMAGE PREVIEW PROCESSING METHOD, AND IMAGE PREVIEW COMPUTER PRODUCT

(75) Inventors: Toshio Miyazawa, Kanagawa (JP); Tetsuya Sakayori, Tokyo (JP); Iwao Saeki, Kanagawa (JP); Yoshinaga Kato, Kanagawa (JP); Bin Lu, Tokyo (JP); Yoshifumi Sakuramata, Tokyo (JP); Junichi Takami, Kanagawa (JP); Yu Sekiguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 981 days.

(21) Appl. No.: 11/381,664

(22) Filed: May 4, 2006

(65) Prior Publication Data

US 2006/0274388 A1 Dec. 7, 2006

(30) Foreign Application Priority Data

Jun. 1, 2005 (JP) .................................. 2005-161427
Feb. 21, 2006 (JP) .................................. 2006-043575

(51) Int. Cl.
   *G06F 15/00* (2006.01)
(52) U.S. Cl. ........ 358/1.9; 358/1.13; 358/527; 358/538; 382/173; 382/175; 382/176; 345/619; 345/660; 345/629; 715/273; 715/274; 715/243; 399/81
(58) Field of Classification Search .................... 358/1.9, 358/1.13, 527, 538; 345/619, 660, 629; 382/173, 382/176, 175; 715/273, 274, 243; 399/81
   See application file for complete search history.

(56) References Cited

U.S. PATENT DOCUMENTS 5,754,348 A * 5/1998 Soohoo .......................... 359/802
   (Continued)

FOREIGN PATENT DOCUMENTS

JP 5-233873 9/1993
   (Continued)

*Primary Examiner* — King Poon
*Assistant Examiner* — Jacky X Zheng
(74) *Attorney, Agent, or Firm* — Oblon, Spivak, McClelland, Maier & Neustadt, L.L.P.

(57) ABSTRACT

An image processing apparatus includes a preview generating unit configured to generate, based on image data, a preview image that is expected to be output; an attribute extracting unit configured to extract an attribute of at least one portion in the image data; a display unit configured to display the preview image; a position-information obtaining unit configured to obtain position information indicative of a position of a specified portion in the preview image; and a processing unit configured to perform, on the image data, a process according to an attribute that corresponds to the position.

14 Claims, 15 Drawing Sheets

U.S. PATENT DOCUMENTS

| | | | |
|---|---|---|---|
| 5,767,978 A * | 6/1998 | Revankar et al. | 358/296 |
| 5,821,929 A * | 10/1998 | Shimizu et al. | 382/190 |
| 5,987,171 A * | 11/1999 | Wang | 382/173 |
| 6,184,859 B1 * | 2/2001 | Kojima | 345/629 |
| 6,212,294 B1 * | 4/2001 | Ikeda | 382/173 |
| 6,330,002 B1 * | 12/2001 | Yamada | 345/629 |
| 6,336,011 B1 * | 1/2002 | Sumio et al. | 399/82 |
| 6,424,742 B2 * | 7/2002 | Yamamoto et al. | 382/173 |
| 6,473,539 B1 * | 10/2002 | Koga | 382/317 |
| 6,590,583 B2 * | 7/2003 | Soohoo | 345/660 |
| 6,956,587 B1 * | 10/2005 | Anson | 345/649 |
| 7,593,961 B2 * | 9/2009 | Eguchi et al. | 1/1 |
| 7,626,743 B2 * | 12/2009 | Ozawa | 358/538 |
| 7,814,430 B2 * | 10/2010 | McComber | 715/771 |
| 2002/0085223 A1 * | 7/2002 | Bigi | 358/1.13 |
| 2005/0156946 A1 * | 7/2005 | Nakano | 345/619 |
| 2007/0143671 A1 * | 6/2007 | Paterson et al. | 715/527 |

FOREIGN PATENT DOCUMENTS

| | | |
|---|---|---|
| JP | 6-4704 | 1/1994 |
| JP | 6-150057 | 5/1994 |
| JP | 7-231387 | 8/1995 |
| JP | 8-279884 | 10/1996 |
| JP | 9-91450 | 4/1997 |
| JP | 11-238096 | 8/1999 |
| JP | 11-288344 | 10/1999 |
| JP | 2001-285534 | 10/2001 |
| JP | 2005-79803 | 3/2005 |
| JP | 2005-94796 | 4/2005 |
| WO | WO 2004/079708 A1 | 9/2004 |

* cited by examiner

| IMAGE CHARACTERISTIC | SETTING ITEM |
|---|---|
| PAGE MARGIN AREA | STAPLING |
| | HOLE PUNCHING |
| | PAGE NUMBERS |
| | FILE NAME |

IMAGE PREVIEW PROCESSING APPARATUS, IMAGE PREVIEW PROCESSING METHOD, AND IMAGE PREVIEW COMPUTER PRODUCT

CROSS-REFERENCE TO RELATED APPLICATIONS

The present document incorporates by reference the entire contents of Japanese priority documents, 2005-161427 filed in Japan on Jun. 1, 2005 and 2006-043575 filed in Japan on Feb. 21, 2006.

BACKGROUND OF THE INVENTION

1. Field of the Invention

The present invention relates to a technology for processing an image.

2. Description of the Related Art

Conventionally, different types of image processing apparatuses have been used, such as a scanner that reads an image from an original document, a copying machine that prints out an image read by a scanner, a printer and a facsimile machine that print out image data externally input, and a multifunction product that includes these functions.

In such image processing apparatuses, a user makes settings for various functions, for example, settings related to a state of an original document such as type and darkness of the original document, settings related to an image processing such as enlargement ratio, reduction ratio, single-sided or double-sided, and size of page margins, and settings related to a finish-up processing for printed documents such as sorting, stapling, and punching holes.

However, to make such settings, it is necessary to find desirable settings from an extremely large number of menu items to make an accurate input. This leads to complicated operations, resulting in low work efficiency.

This problem is significant in a recent multifunction image processing apparatus that has a wide range of functions including functions that are frequently used and functions that are not frequently used, and in a multifunction product that has combinations of various functions.

An image processing apparatus disclosed in Japanese Patent Laid-Open Publication No. H08-279884 performs a pre-scanning when a document holding cover is closed after an original document is placed on a contact glass. The image processing apparatus determines a type of the original document distinguishing between a color image and a black-and-white image, or grasps text portions and photograph portions in the original document based on the image read in the pre-scanning. Thus, image processing procedures are automatically separated so as to correspond to the type of the image in the original document, thereby improving operability of the image processing apparatus.

An image processing apparatus disclosed in Japanese Patent Laid-Open Publication No. 2001-285534 records, when a user inputs settings for conditions to be used to read an image from an original document, the settings as a group of settings corresponding to a reading condition button displayed on the apparatus. The settings in the group are retrieved by selecting the reading condition button, and setting items are automatically updated to the registered setting values, thereby making it possible for the user to make settings with ease.

With the image processing apparatus according to the Japanese Patent Laid-Open Publication No. H08-279884, the type of the image is distinguished based on the image read from the original document in the pre-scanning process, and the separated processing procedures are automatically performed on the image based on a result of the distinguishing process. However, because the result of the scanning is not directly reflected in the setting items displayed on a printing setting screen, the efficiency in the operation to establish the printing setting is not improved.

With the image processing apparatus disclosed in the Japanese Patent Laid-Open Publication No. 2001-285534, a user makes the settings for the conditions in reading an image from an original document, and the settings are stored, as a group, corresponding to the reading condition button. When one of the reading condition buttons is specified, the previously-registered settings corresponding to the specified button are retrieved, and setting items are automatically updated to the registered setting values; however, the operation for this apparatus is not different from a normal setting operation in terms of the arrangement in which the user is required to specify one of the reading condition buttons. Thus, even if the settings for the reading conditions can be performed easily, it does not mean that the efficiency in the setting operation is improved.

SUMMARY OF THE INVENTION

It is an object of the present invention to at least partially solve the problems in the conventional technology.

An image processing apparatus according to one aspect of the present invention includes a preview generating unit configured to generate, based on image data, a preview image that is expected to be output; an attribute extracting unit configured to extract an attribute of at least one portion in the image data; a display unit configured to display the preview image; a position-information obtaining unit configured to obtain position information indicative of a position of a specified portion in the preview image; and a processing unit configured to perform, on the image data, a process according to an attribute that corresponds to the position.

An image processing method according to another aspect of the present invention includes generating, based on image data, a preview image that is expected to be output; extracting an attribute of at least one portion in the image data; displaying the preview image; obtaining position information indicative of a position of a specified portion in the preview image; and performing, on the image data, a process according to an attribute that corresponds to the position.

A computer-readable recording medium according to still another aspect of the present invention stores a computer program for realizing the image processing method according to the above aspect.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention will be explained in detail below with reference to the accompanying drawings.

In a first embodiment of the present invention, as an example of an image processing apparatus, a multifunction product, which is a so-called multi function peripheral (MFP), having combined functions including a copying function, a facsimile (FAX) function, a printing function, a scanner function, and a distributing function for distributing input images (e.g. an image read from an original document using the scanner function or an image input using the printing function or the FAX function).

Figure 1:
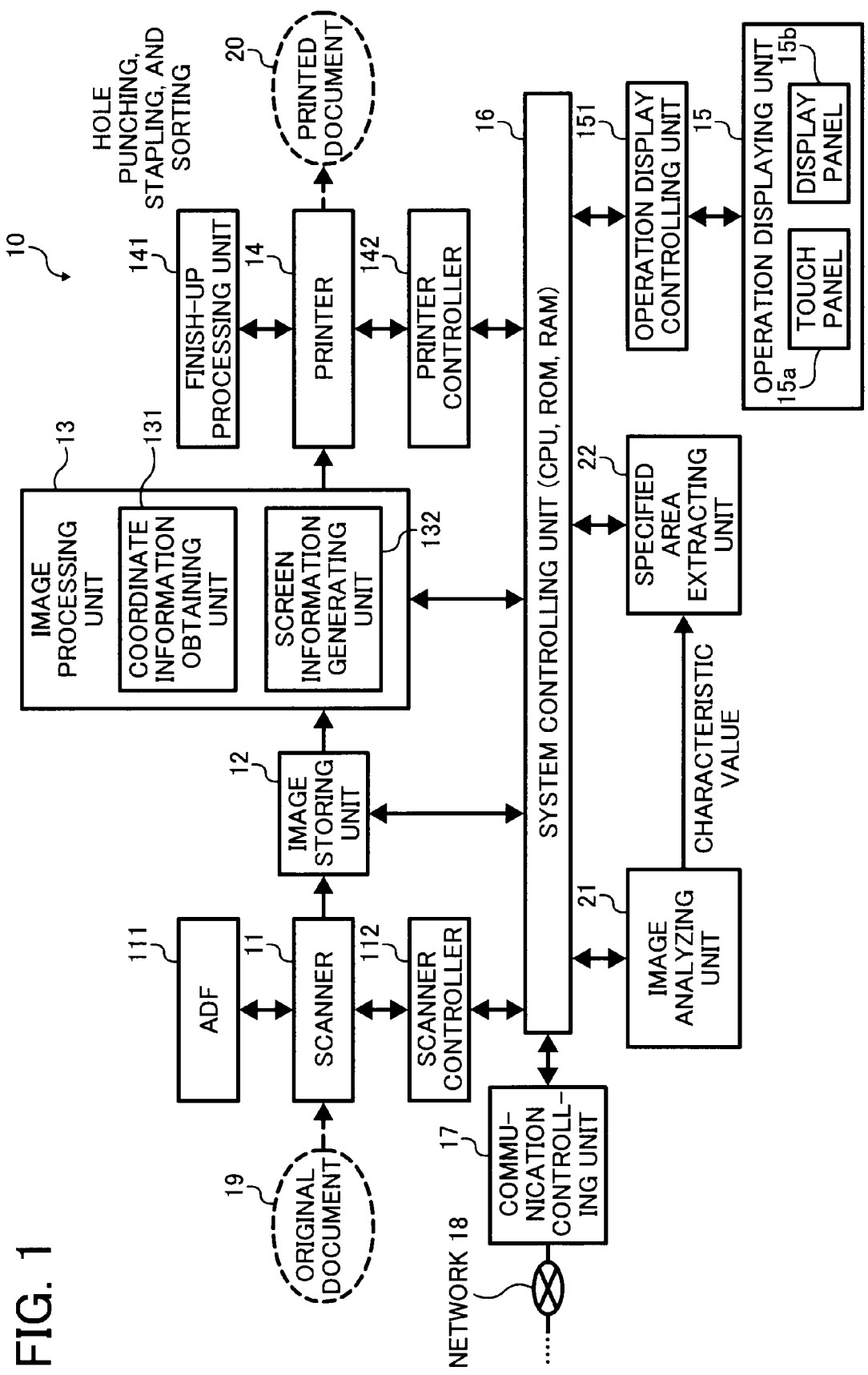
FIG. 1 is a block diagram of an image processing apparatus according to a first embodiment of the invention.

FIG. 1 is a block diagram of a multifunction product 10 according to the first embodiment. The multifunction product 10 shown in FIG. 1 includes a scanner 11, an auto document feeder (ADF) 111, a scanner controller 112, an image storing unit 12, an image processing unit 13, a printer 14, a printer controller 142, a finish-up processing unit 141, an operation displaying unit 15, an operation display controlling unit 151, a system controlling unit 16, and a communication controlling unit 17. The multifunction product 10 is connected to a network 18 via the communication controlling unit 17. The multifunction product 10 reads an image from an original document 19, performs an image processing, and outputs the image as a printed document 20. The multifunction product 10 further includes an image analyzing unit 21 and a specified area extracting unit 22.

The system controlling unit 16 is connected to other constituent elements and exercises control over the multifunction product 10 as a whole. The system controlling unit 16 includes a central processing unit (CPU), a read-only memory (ROM), a random-access memory (RAM), which are not shown, and various types of processing are executed when the CPU is operated based on a program stored in the ROM, using the work areas in the RAM.

A program executed in the multifunction product 10 may be provided as being recorded on a computer-readable recording medium like a compact-disc read-only memory (CD-ROM), a flexible disc (FD), a compact-disc recordable (CD-R), a digital versatile disk (DVD), as a file in an installable format or in an executable format. In this situation, the CPU included in the system controlling unit 16 reads the program from the recording medium and loads the program onto a primary storage device (not shown), and thereby enables the multifunction product 10 to achieve various functions. Alternatively, another arrangement is acceptable in which the program is stored in a computer connected to the network 18 such as the Internet and is provided through a download via the network. As another alternative, an arrangement is acceptable in which the program is provided or distributed via a network such as the Internet.

The communication controlling unit 17 is connected to the network 18, such as a local area network (LAN) and the Internet, and transmits and receives image data, control data, and the like to and from other devices connected to the network, according to a communication protocol.

According to an instruction from the system controlling unit 16, the scanner controller 112 controls the scanner 11.

Under the control of the scanner controller 112, the scanner 11 converts an image of the original document 19 into digital image data. The ADF 111 is configured to forward, one by one, each of a plurality of pages of original documents that have been set on the ADF 111, to a reading position of the scanner 11. When being used with the ADF 111, the scanner 11 is enabled to automatically read images from a plurality of pages of original documents in a successive manner. Also, because the ADF 111 is capable of not only forwarding, to the scanner 11, single-sided original documents that have printing only on one side of the paper, but also flipping over and forwarding double-sided original documents that have printing on both sides of the paper. Thus, it is possible to have the scanner 11 read images from double-sided original documents.

The image storing unit 12 is a buffer memory that, according to an instruction from the system controlling unit 16, temporarily stores therein image data obtained as a result of the reading by the scanner 11, image data having been input from the outside of the multifunction product 10 via the network 18, and the like. The multifunction product 10 according to the first embodiment is configured to process and form images from both the image data obtained as a result of the reading by the scanner 11 included in the multifunction product 10 and the image data having been input from the outside of the multifunction product 10 via the network 18 or the like.

According to an instruction from the system controlling unit 16, the image processing unit 13 performs processing for a gamma correction or a modulation transfer function (MTF) correction on multi-value data that has been forwarded by the scanner 11 and is temporarily stored in the image storing unit 12. Then, the image processing unit 13 performs a gradation processing including a slice processing and a dither processing so as to perform a binarization processing (or a processing to obtain multi value data). Further, the image processing unit 13 also performs various types of image processing (including enlargement/reduction, and adjustment of the darkness/colors) and a layout changing processing (including double-sided printing/single-sided printing, printing multiple pages on one page, adjustment of the page margin size) that correspond to the functions specified in the settings by the user.

The image processing unit 13 includes a coordinate information obtaining unit 131 and a screen information generating unit 132. The coordinate information obtaining unit 131 is a position information obtaining unit that obtains coordinate information related to the input image stored in the image storing unit 12. The screen information generating unit 132 is a preview image generating unit that generates, according to input image data, a preview image to be displayed on a display panel 15b, which is described later. In the preview image generated by the screen information generating unit 132, both a preview image to be printed and information for a screen to input processing items related to the preview image are put together.

According to an instruction from the system controlling unit 16, the printer controller 142 controls the printer 14.

The printer 14 is a printer that uses an electronic photographing technique and that, under the control of the printer controller 142, deflects and scans a light beam based on the image data processed by the image processing unit 13, applies toners to a static latent image formed on a photosensitive member so as to develop the image, transfers the generated toner image onto a transfer paper, and performs a fixing processing.

The printer 14 includes the finish-up processing unit 141. The finish-up processing unit 141 receives an automatic setting or a setting input by a user and performs a finish-up processing including a sorting processing for sorting the printed documents 20 obtained as a result of the printing processing by the sets of documents or by the pages, a stapling processing for piling and stapling a plurality of sheets of printed media together, and a hole punching processing for opening punch holes so that a plurality of sheets of printed media can be put in a binder or a folder.

According to an instruction from the system controlling unit 16, the operation display controlling unit 151 controls inputs and outputs to and from the operation displaying unit 15. For example, the operation display controlling unit 151 controls the outputs of the data processed by the image processing unit 13 to a touch panel 15a and the display panel 15b included in the operation displaying unit 15. To be more specific, the operation display controlling unit 151 has a preview image generated from image data displayed on the display panel 15b. Also, the operation display controlling unit 151 controls the inputs of data from the touch panel 15a.

Under the control of the operation display controlling unit 151, the operation displaying unit 15 receives an input of specified settings via the touch panel 15a, and displays the preview image and also menu items in the settings to set the finish-up on the screen, on the display panel 15b. Thus, a preview image displaying unit is realized. The operation displaying unit 15 may output audio using a speaker (not shown), in addition to a visual display.

The operation displaying unit 15 displays the functions that the multifunction product 10 is expected to execute as the menu items on the setting screen and receives, from a user, an input of settings selected out of the displayed menu items. For example, the operation displaying unit 15 receives settings including a setting for the reading conditions that are used by the scanner 11 and correspond to the state of the original document, a setting used by the image processing unit 13 for processing the read image data, a setting for the printing conditions used by the printer 14, and a setting used by the finish-up processing unit 141 for performing a finish-up processing including sorting, stapling, and hole punching with the printed documents obtained as a result of the printing processing.

Although the display panel 15b and the touch panel 15a are shown separately in the drawing, they may be structured integrally in this example. When the display panel 15b is touched by a finger of an operator or a stylus pen (hereinafter, a "pointer"), the touch panel 15a receives a touch input at the same time. As a result of the touch of the operator's finger or the stylus pen, the touch input is received. In this situation, the touch panel 15a electrically or magnetically detects the position at which the pointer has touched on the panel. The display panel 15b may be a display device that is for an exclusive use and is included in the multifunction product 10.

Figure 2:
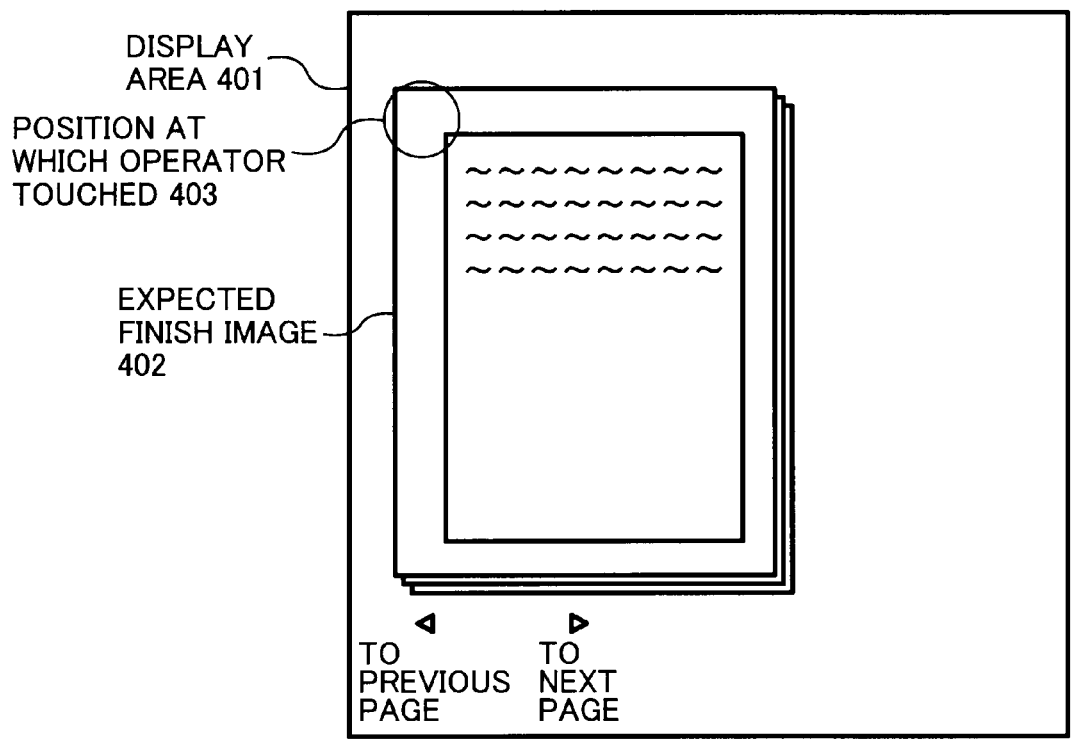
FIG. 2 is a schematic of a preview image generated by the image processing apparatus, based on input image data.

FIG. 2 is a schematic of the preview image generated by the multifunction product 10, based on an input of the image data. Displayed inside a display area 401 on the touch panel 15a is an expected finish image 402.

The following discussion is based on a situation where an operator touches a part marked with the reference number 403 shown in FIG. 2, using a pointer. When the operator touches the part 403 using the pointer, while looking at the preview image displayed on the display panel 15b, the touch panel 15a receives an input of position information that indicates a spatial position in the finished state of the printed document in the displayed preview image. In this situation, the coordinate information obtaining unit 131 analyzes the position information received by the touch panel 15a and obtains coordinate information with respect to the image touched by the pointer.

The image analyzing unit 21 performs various types of processing including an optical character recognition (OCR) processing for optically recognizing characters in the image data stored in the image storing unit 12 and calculates various image characteristic values that express image attributes of the image in the original document. The image characteristic values may be roughly divided into three categories, namely an image category, a layout category, and an auto document feeder (ADF) category. For example, in the image category, information related to the types of the images (text areas, photograph areas, illustrations, or a mixture of any of these), the colors being used (information of the colors used in the original document and to distinguish between monochrome images and color images), the darkness of the original document, the edge amount, the pixel density (the proportion of an area of a portion having pixels to the whole original document), and the character size being used is expressed as numerical values. For example, to judge the type of an image, it is acceptable to use the methods proposed in the Japanese Patent Laid-Open Publication No. H5-233873 and the Japanese Patent Laid-Open Publication No. H6-004704. In the layout category, information related to the direction of the original document (the information for positional relationship in the up-and-down and the left-and-right directions of the original document), the size of the original document, the dimensions of the page margins at the top, the bottom, the left, and the right of the page, and layout information (whether the original document has multiple columns), and the like, is expressed as numerical values. In the ADF category, information related to the number of pages of the original document, the sides of the original documents (distinction between a double-sided document and a single-sided document), and the like, is expressed as numerical values. For quantitative values among these characteristic values, it is possible to also calculate and use statistical values like an average value, a largest value, and a smallest value.

Figure 3:
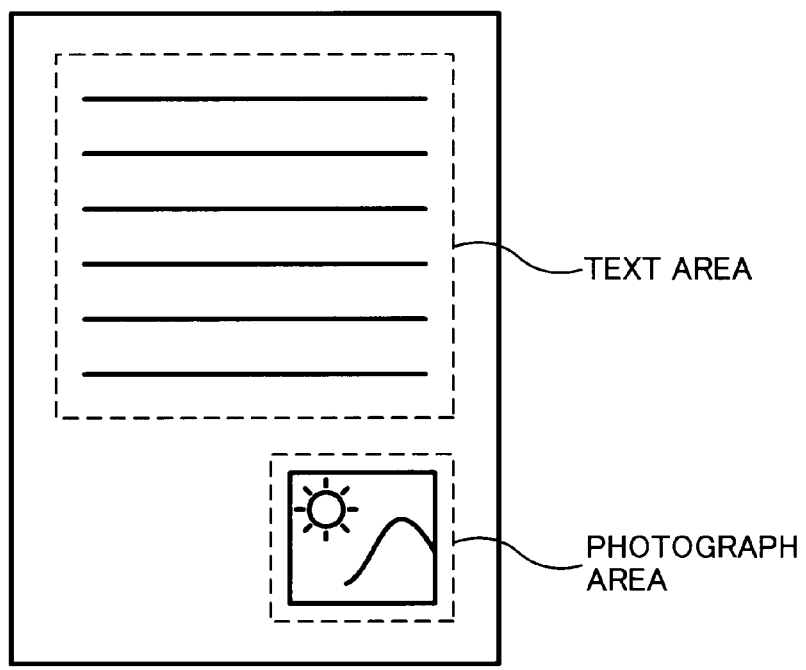
FIG. 3 is a schematic of specified areas displayed in the preview image.

The specified area extracting unit 22 extracts various types of specified areas (for example, page margin areas, contents areas, text areas, and photograph areas) based on various image characteristic values calculated by the image analyzing unit 21. The coordinate values and the type of the area of each of the specified areas extracted by the specified area extracting unit 22 are stored into an area table (not shown), and the specified areas are displayed together with a preview image on the display panel 15b and presented to an operator. To present the specified areas to the operator, frames indicating the specified areas may be displayed in a preview image, as shown in FIG. 3, or the colors in the specified areas may be changed in the display. To be more specific, the frames may be displayed with different colors; for example, a red frame may be used for a text area and a green frame may be used for a photograph area. Alternatively, the RGB (red green blue) values of the image in each of the specified areas may be set differently from one another so that the specified areas are displayed distinctively. The specified areas may be displayed before an operator makes a selection with the specified area extracting unit 22. Alternatively, when a user specifies coordinates with respect to a preview image, the specified area corresponding to the coordinates may be extracted and displayed by the specified area extracting unit 22.

With this arrangement, an image attribute extracting unit is realized with the image analyzing unit 21 and the specified area extracting unit 22.

Next, an image forming processing that is realized through an operation performed by the CPU included in the system controlling unit 16, based on a program stored in the ROM will be explained.

Figure 4:
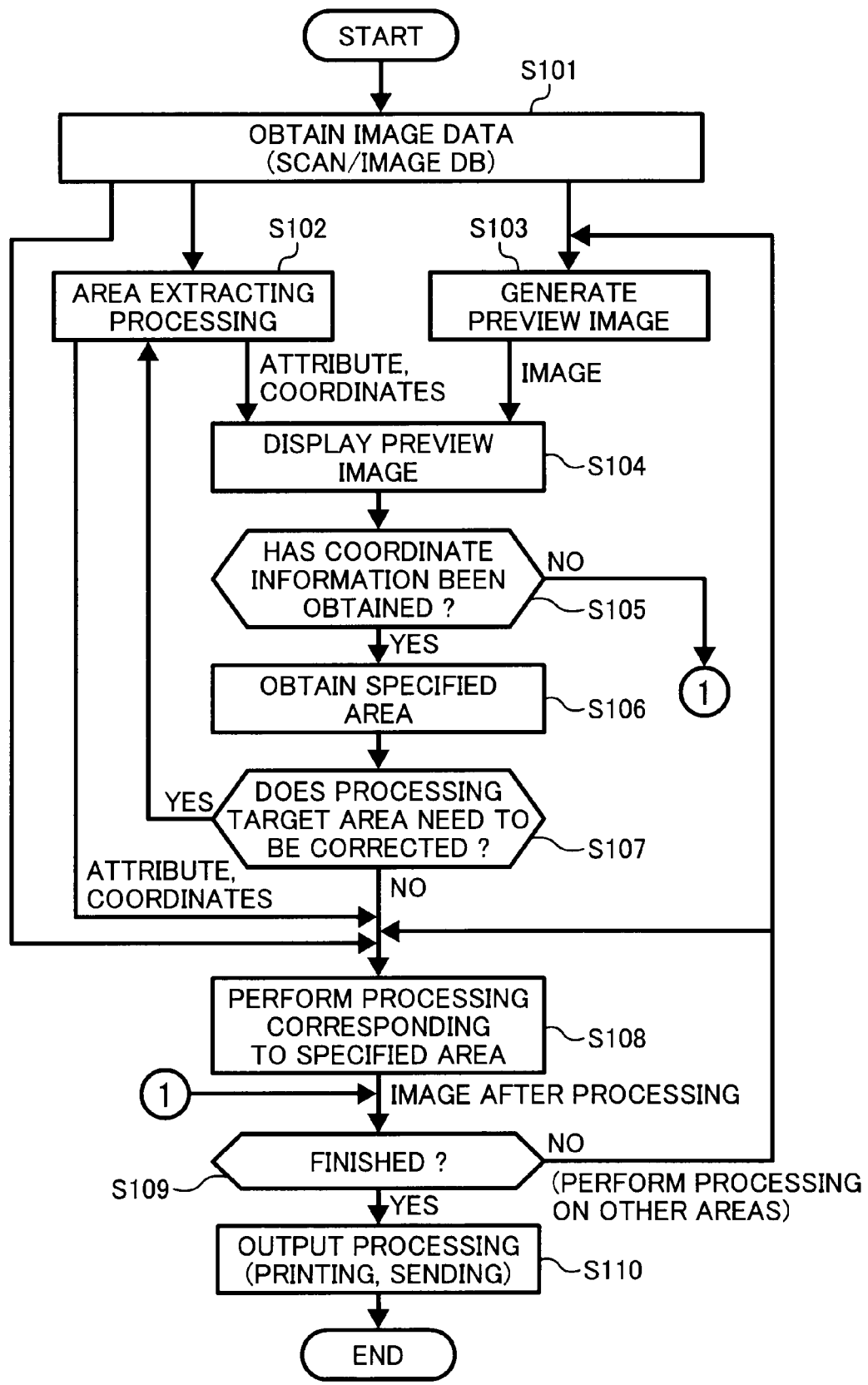
FIG. 4 is a flowchart of an image forming processing.

FIG. 4 is a flowchart of the image forming processing according to the first embodiment. As shown in FIG. 4, in the image forming processing, when image data input from the scanner 11 or image data stored in the image storing unit 12 is obtained (step S101), an area extracting processing for extracting a specified area (the attribute and the coordinates) in the image data is performed by the specified area extracting unit 22 (step S102; the image attribute extracting unit), and a preview image generating processing is performed by having the screen information generating unit 132 generate a preview image in which the resolution level is changed so that the preview image can be displayed on the display panel 15b (step S103; the preview image generating unit), and then the preview image in which the extracted specified area is indicated is displayed on the display panel 15b (step S104; the preview image displaying unit).

Figure 5:
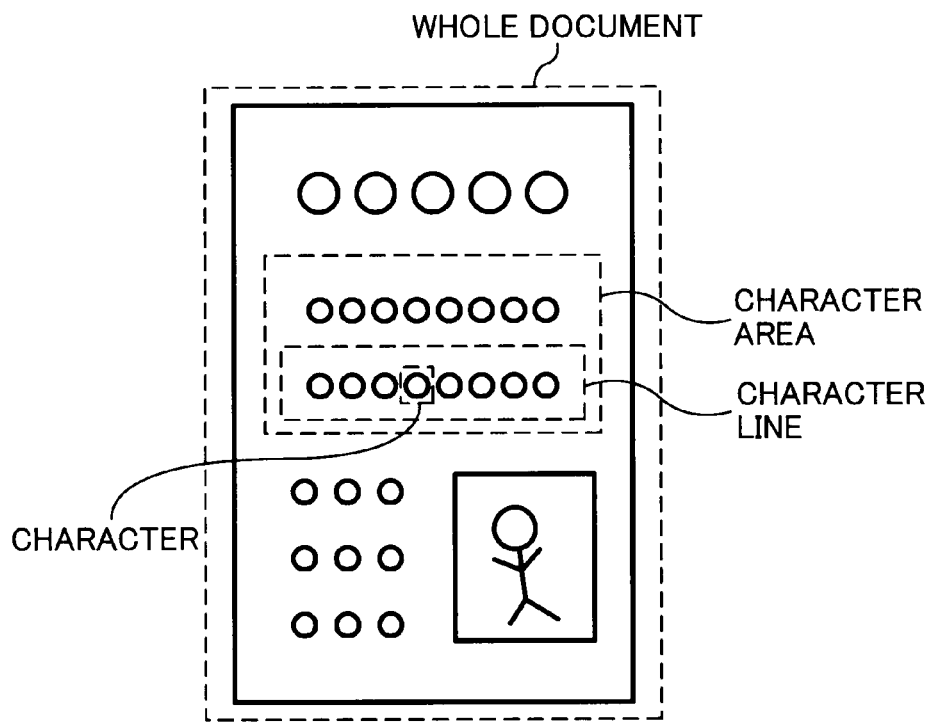
FIG. 5 is a schematic of a specified area displayed in the preview image when the image is a document image.
Figure 6:
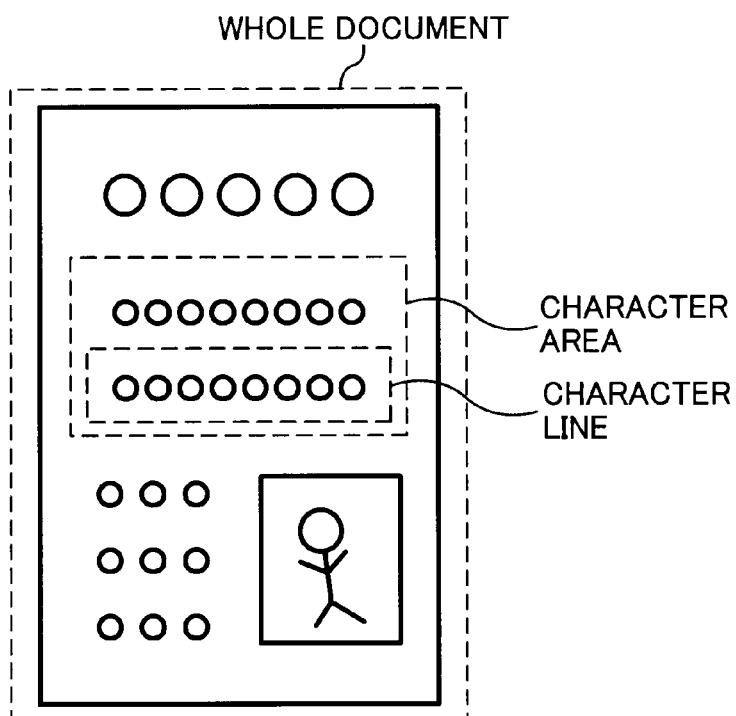
FIG. 6 is a schematic of a specified area displayed in the preview image when the image is a document image.

In this example, the specified area extracted at step S102 is a specified area for which the extracting processing can be performed in a short period of time. An example in which the color of the characters in the preview image displayed on the display panel 15b needs to be changed will be explained. When an original document is a document image, as shown in FIG. 5, specified areas having different image attributes such as a "character", a "character line", a "character area", and "the whole document" can be specified. However, when the "character" is to be extracted as a specified area, it is required to perform an OCR processing, and a problem arises where the OCR processing requires a longer processing period than an area judgment processing. To cope with this problem, in the first embodiment, the extraction of the specified area performed at step S102 is limited to a specified area that requires no processing period for the extraction processing. For example, in a document image as shown in FIG. 5, an initial setting is made so that the specified area extracting processing is performed only for the "character line", the "character area", and "the whole document", because the extraction processing for each of these items takes relatively a shorter period of time. For the "character", a specified area extracting processing can be performed upon a request from a user. As a result, frames that indicate the "character line", the "character area", and "the whole document" are displayed in the preview image, as shown in FIG. 6.

Needless to say, it is acceptable to display all of the specified areas that have already been extracted. When it is preferred to display the frame for the "character line" first, and then to make a transition to another processing target area such as the "character area" or "the whole document", another arrangement is acceptable in which, according to an instruction from a user, the frame for the "character line" is erased, and then a frame for the "character area" is displayed. For example, when the pointer specifying the "character line" is moved in the direction toward the "character area" (i.e. an enlarging direction), the frame for the "character line" is erased, and the display makes a transition so that the frame for the "character area" is displayed. When the pointer specifying the "character area" is moved in the direction toward the "character line" (i.e. a reducing direction), the frame for the "character area" is erased, and the display makes a transition so that the frame for the "character line" is displayed. Further, when it is desired that a processing area is specified, because one of the specified areas needs to be displayed, even if all the specified areas having been extracted are displayed, as shown in FIG. 5, it is acceptable to display different specified areas in different display manners (for example, display different specified areas in different colors) so that it is understood which one of the specified areas is currently being selected and active.

As explained above, when an operator touches the touch panel 15a and makes a touch input while the preview image is displayed on the display panel 15b, and if the coordinate information obtaining unit 131 obtains coordinate information (step S105: YES; the position information obtaining unit), it is checked if the obtained coordinate values are stored in the area table. When the obtained coordinate values are stored in the area table, the specified area is obtained as a processing target (step S106). If the coordinate information obtaining unit 131 obtains no coordinate information (step S105: NO), the procedure advances to step S109.

Figure 7:
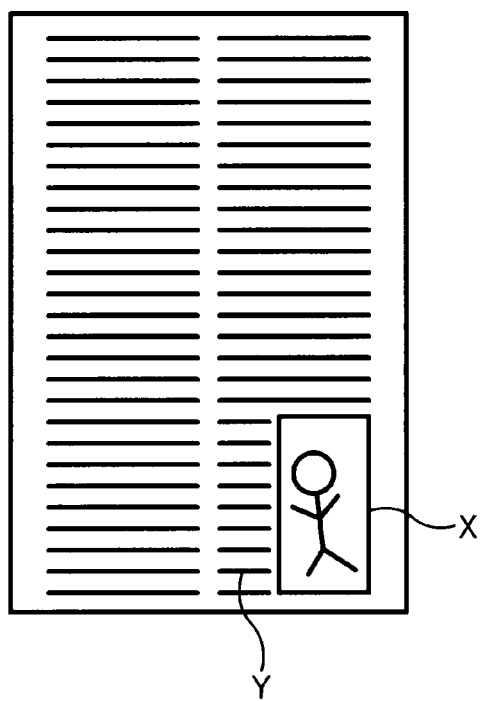
FIG. 7 is a schematic for illustrating correction of a processing target area.

In this situation, when the processing that corresponds to the specified area being the processing target is a processing to correct the processing target area (step S107: YES), the procedure returns to step S102 and a specified area is extracted again. An example of a situation where the processing target area is corrected is, for example, when a photograph area X as shown in FIG. 7 is recognized, by mistake, as a part of the text area Y that surrounds the photograph area X, the photograph area X is corrected to be a text area. In this situation, for example, a re-extraction key (not shown) is assigned to the specified area.

When the processing that corresponds to the specified area being the processing target is not a processing to correct the processing target area (step S107: NO), the processing that corresponds to the specified area is performed on the image data (step S108; the processing performing unit). To be more specific, at step S108, for the specified area in the image data obtained at step S101, the processing that corresponds to the specified area (the attribute and the coordinates) is performed on the image data. An area/setting correspondence table is prepared in advance in which the types of the areas for the specified areas are shown in correspondence with the setting items. To explain the correspondence between the types of the areas for the specified areas and the setting items, for example, the "photograph area" is in correspondence with a setting item, "the type of the photograph". Another example is that the "page margin area" is in correspondence with a setting item, "binding margin". An example of the processing that corresponds to the specified area is a processing to change "the type of the photograph" for the "photograph area" in the image data.

At step S109 that follows, it is judged whether the processing should be finished, based on a predetermined key input. An example of when the judgment result will be "No" is when it is desired that, in one sheet of original document, different types of processing are performed on different specified areas, or when specified areas cannot be specified all at once for one type of processing. When the judgment result is in the negative (step S109: NO), the image after the processing is used in the preview image generation process (step S103). In addition, because the image after the processing is also the processing target image, it is used when the processing at step S108 is performed as well.

On the other hand, when it is judged that the processing should be finished (step S109: YES), an output processing is performed by having the printer 14 perform the printing process and having the finish-up processing unit 141 perform the finish-up processing (step S110). The output processing at step S110 is not limited to the printing process but may be other types of output processing such as sending the image by e-mail, writing the image into a file, or saving the image into a folder, or any other type of output processing performed afterwards. Also, it is acceptable not to have the image output, but just to check the image in a preview image without outputting it.

In the first embodiment, when the original document is a document image, it has been explained that the specified areas having different image attributes such as a "character", a "character line", a "character area", and "the whole document" as shown in FIG. 5 can be specified; however, the present invention is not limited to this example. For example, it is possible to specify, as a specified area, semantic information like a "title" or a "main text" in the document image. To obtain such semantic information, it is judged whether the image represents a "title" or a "main text" from the coordinates of the extracted specified area or the size of the character line or the character. For example, when a text is written at the top center of the page with relatively larger characters than in other character lines, it is judged that the image represents a "title". When the image represents a "title", the menu for the "processing" may include a processing to emphasize the title, such as "underline the text" or "change the font into an italic type".

Figure 8:
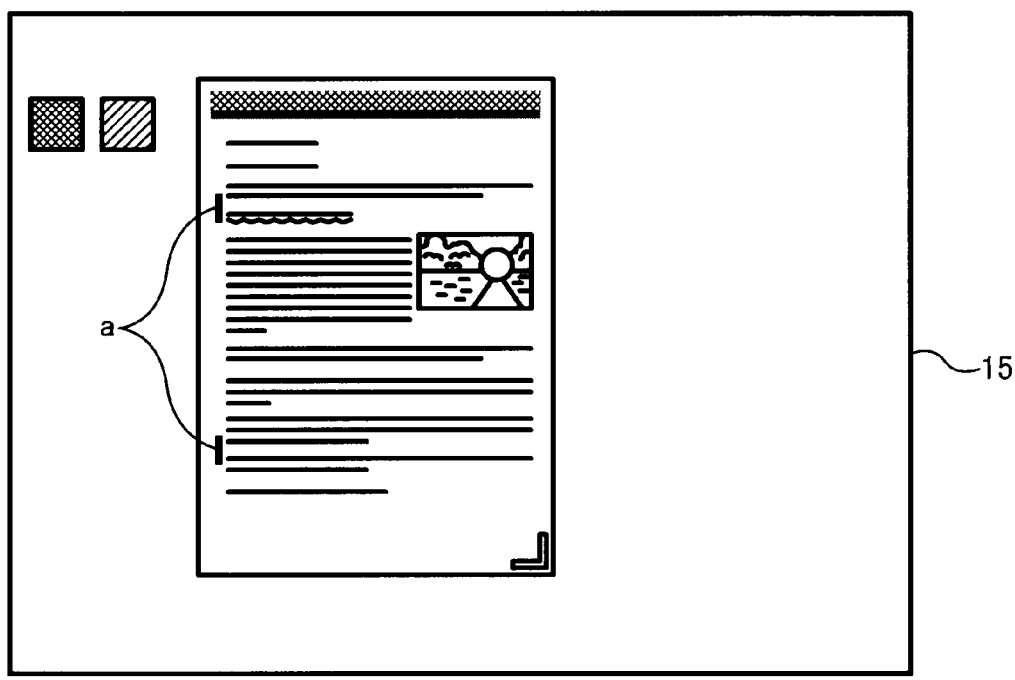
FIG. 8 is a schematic of a display screen after a setting for stapling is made.
Figure 9:
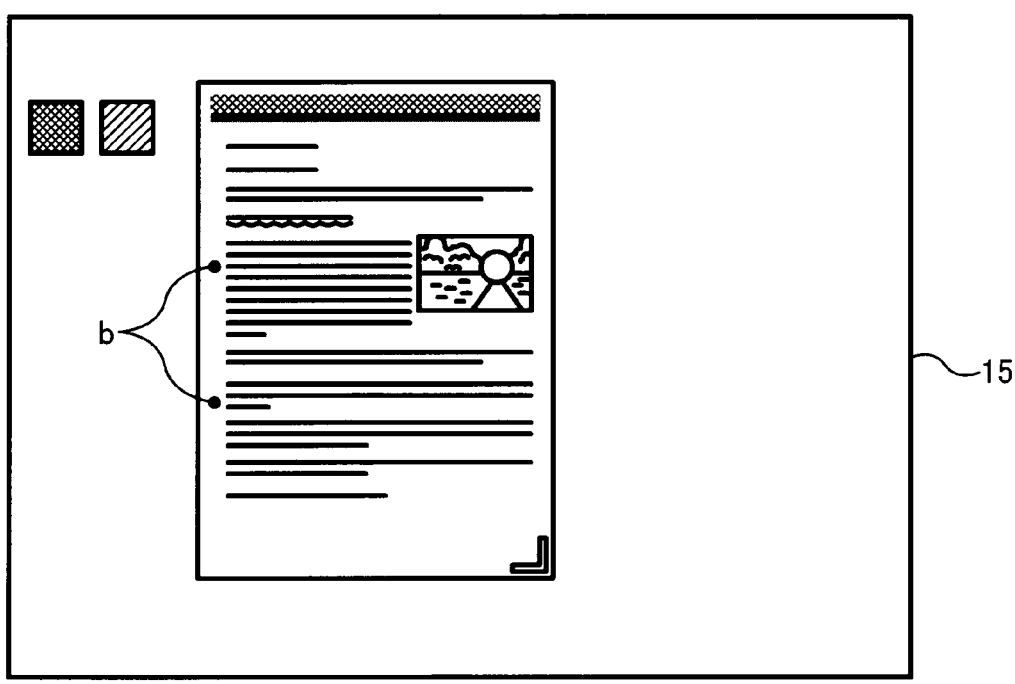
FIG. 9 is a schematic of a display screen after a setting for punching holes is made.

Next, specific examples of the processing that corresponds to the specified areas will be explained.
(1) Setting for the Stapling Process When a user touches a page margin area (for example, the left end of an original document image) at a position where stapling can be performed, the staple marks "a" are set on two places on the left of the copy, and the screen display will be the one as shown in FIG. 8. As for canceling the setting for the stapling process, when the user touches the staple marks "a", the setting is cancelled.
(2) Setting for the Hole Punching Process When a user touches a page margin area (for example, the left end of an original document image) at a position where holes can be punched, the punch hole marks "b" are set on two places on the left of the copy, and the screen display will be as shown in FIG. 9. As for canceling the setting for the hole punching process, when the user touches the punch hole marks "b", the setting is cancelled.

As explained so far, according to the first embodiment, the image attribute of the preview image generated from the image data is extracted and also, the preview image generated from the image data is displayed. Then, the predetermined position information with respect to the displayed preview image is obtained, and a processing that corresponds to the image attribute of the preview image related to the obtained position information is performed on the image data. With this arrangement, it is possible to improve the efficiency of the setting operation related to various types of processing. Thus, an effect is achieved where a high level of convenience is accomplished.

Further, the arrangement is made in which a specified area is extracted, based on an image characteristic value of the image data, which serves as the image attribute. With this arrangement, an effect is achieved where it is possible to specify a specified area that has various image attributes such as a "character", a "character line", a "character area", and "the whole document".

Further, with the arrangement in which the extracted specified area is displayed together with a preview image, an effect is achieved where an even higher level of convenience is accomplished.

In addition, the arrangement is made in which only a predetermined specified area that requires no processing period is extracted from among the specified areas on which a processing can be performed, and when it is instructed that a transition should be made from the specified area to another specified area that has not been extracted, based on the obtained position information, another specified area that corresponds to the position information is extracted. With this arrangement, when an input image needs to be displayed in a short period of time, only the specified area extracting processing that requires no processing period is performed at first, and then another specified area extracting processing that is needed according to an instruction from the operator is performed. Thus, an effect is achieved where it is possible to complete a display in a short period of time and to present various specified areas.

Next, a second embodiment of the present invention will be explained with reference to FIG. 10 to FIG. 12. The elements that are in common with the first embodiment will be referred to using the same reference characters, and the explanation thereof will be omitted.

In the first embodiment, the processing to be performed is changed in correspondence with the specified area, based on the image characteristic values expressing the image attributes. In the second embodiment, image data is divided into small areas (i.e. a mesh) that are specified in advance, and a processing to be performed is changed in correspondence with the image characteristic (for example, whether an edge exists or the average color) in units of the small areas, based on the image characteristic value expressing the image attributes.

Figure 10:
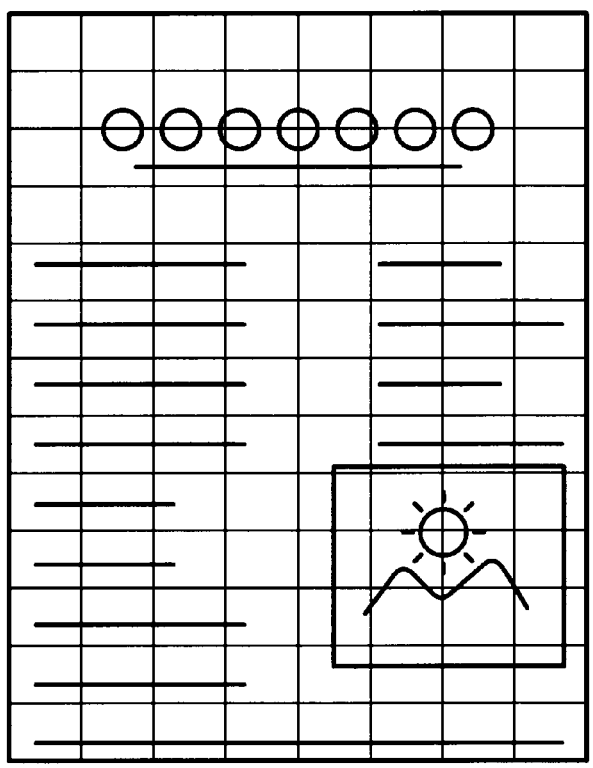
FIG. 10 is a schematic for illustrating a state of image data according to a second embodiment of the invention, divided into predetermined small areas (meshes)

FIG. 10 is a schematic for illustrating a state in which image data is divided into small areas (i.e. a mesh) that are specified in advance, according to the second embodiment. An example in which the background color of the preview image displayed on the display panel 15b as shown in FIG. 10 is to be changed for each of the sections in the mesh will be explained. For example, each of the small areas in the mesh may have a size of 16 pixels by 16 pixels.

Figure 11:
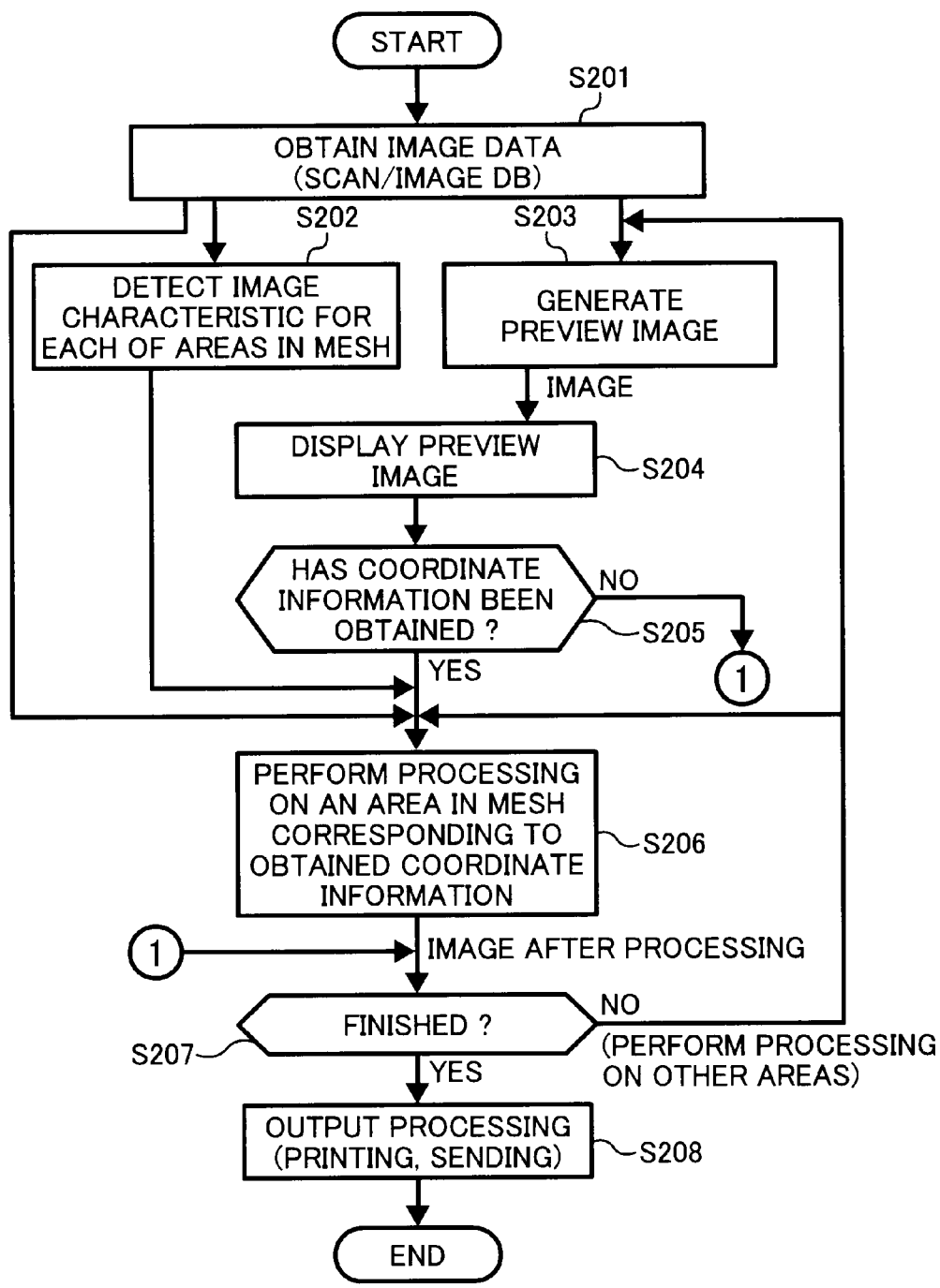
FIG. 11 is a flowchart of an image forming processing.
Figure 12:
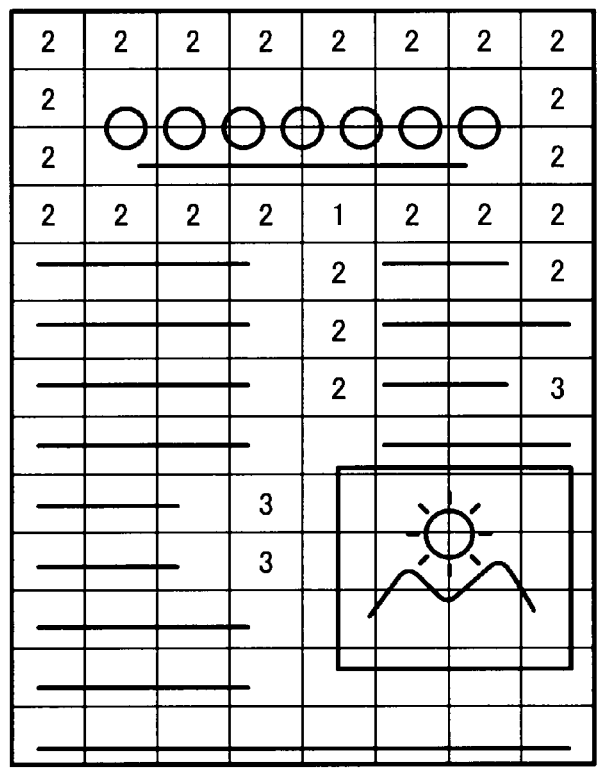
FIG. 12 is a schematic for illustrating a transition state.

FIG. 11 is a flowchart of an image forming processing according to the second embodiment. As shown in FIG. 11, in the image forming processing according to the second embodiment, when image data input from the scanner 11 or image data stored in the image storing unit 12 is obtained (step S201), an image characteristic (e.g. the darkness of the original document, or the edge amount) for each of the small areas in the mesh, which are specified in advance, in the image data is detected by the image analyzing unit 21 (step S202; the image attribute extracting unit), and a preview image generating processing is performed by having the screen information generating unit 132 generate a preview image in which the resolution level is changed so that the preview image can be displayed on the display panel 15b (step S203; the preview image generating unit), and then the preview image is displayed on the display panel 15b (step S204; the preview image displaying unit).

As explained above, when an operator touches the touch panel 15a and makes a touch input while the preview image is displayed on the display panel 15b, and if the coordinate information obtaining unit 131 obtains coordinate information (step S205: Yes; the position information obtaining unit), the small area in the mesh that corresponds to the obtained coordinate information is identified as a target of the processing (e.g. a processing to change the background color) (step S206; the processing performing unit). On the other hand, if the coordinate information obtaining unit 131 obtains no coordinate information (step S205: No), the procedure advances to step S208.

Next, the method of determining a small area in the mesh that corresponds to the obtained coordinate information at step S206 will be explained. In the second embodiment, when a small area in the mesh having been specified at first is specified in a successive manner again, a transition is made between areas. To be more specific, when a particular small area in the mesh is specified twice in a successive manner, it is considered that areas within the mesh having an equal image characteristic amount and being connected (i.e. connected areas) are specified. Next, when the particular small area in the mesh is specified again, it is considered that areas within a predetermined distance having an equal image characteristic amount and not being connected (i.e. unconnected areas) are specified. Further, when the particular small area in the mesh is specified one more time, it is considered that the whole document is specified. In other words, according to the second embodiment, transitions are made between the following elements: "one small area⇆areas within the mesh having an equal image characteristic amount and being connected⇆areas within a predetermined distance having an equal image characteristic amount and not being connected⇆the whole document". FIG. 12 is a schematic for illustrating the transition state. The area marked with the character "1" is the small area within the mesh that is specified initially. The areas marked with the character "2" are areas having an equal image characteristic amount and being connected (i.e. the connected areas). The areas marked with the character "3" are areas within a predetermined distance having an equal image characteristic amount and not being connected (i.e. the unconnected areas). An example of the image characteristic amount in the small area is an average density of the RGB values. When an average density of the RGB values is equal to or lower than a predetermined threshold value, the image characteristic amounts may be judged to be substantially equal.

At step S207 that follows, it is judged whether the processing should be finished, based on a predetermined key input. An example of when the judgment result will be "NO" is when it is desired that, in one sheet of original document, different types of processing are performed on different specified areas, or when specified areas cannot be specified all at once for one type of processing. When the judgment result is in the negative, (step S207: NO), the image after the processing is used in the preview image generation process (step S203). In addition, because the image after the processing is also the processing target image, it is used when the processing at step S206 is performed as well.

On the other hand, when it is judged that the processing should be finished (step S207: YES), an output processing is performed by having the printer 14 perform the printing process and having the finish-up processing unit 141 perform the finish-up processing (step S208). The output processing at step S208 is not limited to the printing process but may be other types of output processing such as sending the image by e-mail, writing the image into a file, or saving the image into a folder, or any other type of output processing performed afterwards.

Also, it is acceptable not to have the image output, but just to check the image in a preview image without outputting it.

As explained so far, according to the second embodiment, the image attribute of the image data is extracted, and also a preview image generated from the image data is displayed. Then, the predetermined position information with respect to the displayed preview image is obtained, and a processing that corresponds to the image attribute related to the obtained position information is performed on the image data. With this arrangement, it is possible to improve the efficiency of the setting operation related to various types of processing. Thus, an effect is achieved where a high level of convenience is accomplished.

Further, as the image attribute, an image characteristic amount for each of the small areas, based on the image characteristic value of the image data is extracted. A transition is made to small areas each of which has an image characteristic amount substantially equal to the image characteristic amount of one of the small areas related to the obtained position information. The processing is performed integrally on the small areas. Thus, an effect is achieved where it is possible to improve the efficiency of the processing.

In addition, the transition is made to the small areas that are connected to one another and each of which has the image characteristic amount substantially equal to the image characteristic amount of the one of the small areas. Thus, an effect is achieved where it is possible to perform the processing with a high degree of precision.

Next, a third embodiment of the present invention will be explained with reference to FIG. 13 to FIG. 21. The elements that are in common with the first embodiment or the second embodiment will be referred to using the same reference characters, and the explanation thereof will be omitted.

In the first embodiment, the processing to be performed is changed in correspondence with the specified area, based on an image characteristic value expressing an image attribute. In the second embodiment, the image data is divided into small areas (i.e. a mesh) that are specified in advance, and a processing to be performed is changed in correspondence with the image characteristic (for example, whether an edge exists or the average color) in units of the small areas, based on the image characteristic value expressing the image attributes. In the third embodiment, an arrangement is made so that a processing that corresponds to an image characteristic is provided.

Figure 13:
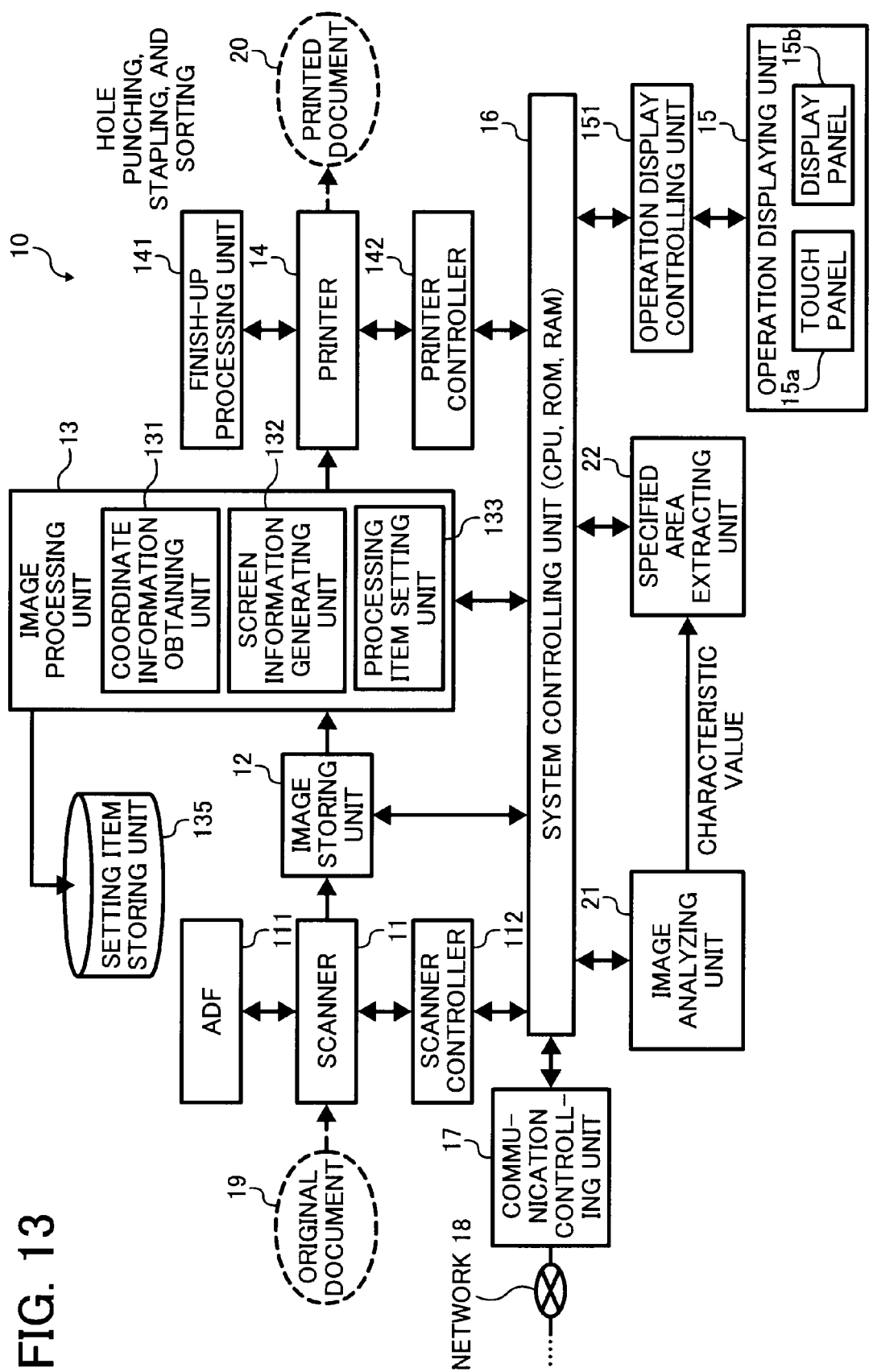
FIG. 13 is a block diagram of an image processing apparatus according to a third embodiment of the invention.

FIG. 13 is a block diagram of the multifunction product 10 according to a third embodiment of the invention. The image processing unit 13 according to the third embodiment includes, in addition to the coordinate information obtaining unit 131 and the screen information generating unit 132, a processing item setting unit 133 and a setting item storing unit 135.

The processing item setting unit 133 makes access to the setting item storing unit 135, based on an image characteristic of an area that corresponds to the coordinate information obtained by the coordinate information obtaining unit 131 and determines, in correspondence with an item in the image processing or in the finish-up processing (hereinafter, a "processing item"), a processing item to be displayed on the operation displaying unit 15.

Figures 14, 15:
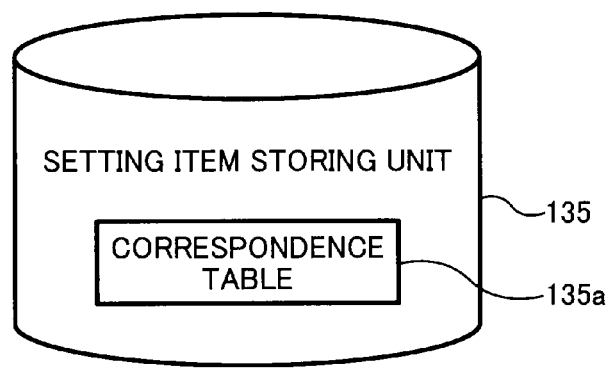
FIG. 14 is a block diagram of a setting item storing unit.
FIG. 15 is a schematic of a correspondence table.

FIG. 14 is a block diagram of the setting item storing unit 135. The setting item storing unit 135 includes an image characteristic processing item correspondence table (hereinafter, a "correspondence table") 135a and stores therein a table in which image characteristics are shown in correspondence with processing items. The processing item setting unit 133 refers to the correspondence table 135a for the coordinates resulting from a touching of a pointer and having been obtained by the coordinate information obtaining unit 131 and selects a corresponding processing item.

FIG. 15 is a schematic for the correspondence table 135a. The correspondence table 135a shows the correspondence between the image characteristics that correspond to the coordinates in an image that are obtained as a result of the touching onto the touch panel 15a and the setting items. In the correspondence table 135a, when the image characteristic of the position 403 (cf. FIG. 2) touched by a user is a page margin area, four setting items, namely stapling, hole punching, page numbers, and file name, correspond to the image characteristic, as setting item options. The processing item setting unit 133 refers to the correspondence table 135a shown in FIG. 15, has the screen information generating unit 132 generate screen information, and has a screen showing the setting items displayed on the display panel 15b.

Next, an image forming processing that is realized through an operation performed by the CPU included in the system controlling unit 16, based on a program stored in the ROM will be explained.

Figure 16:
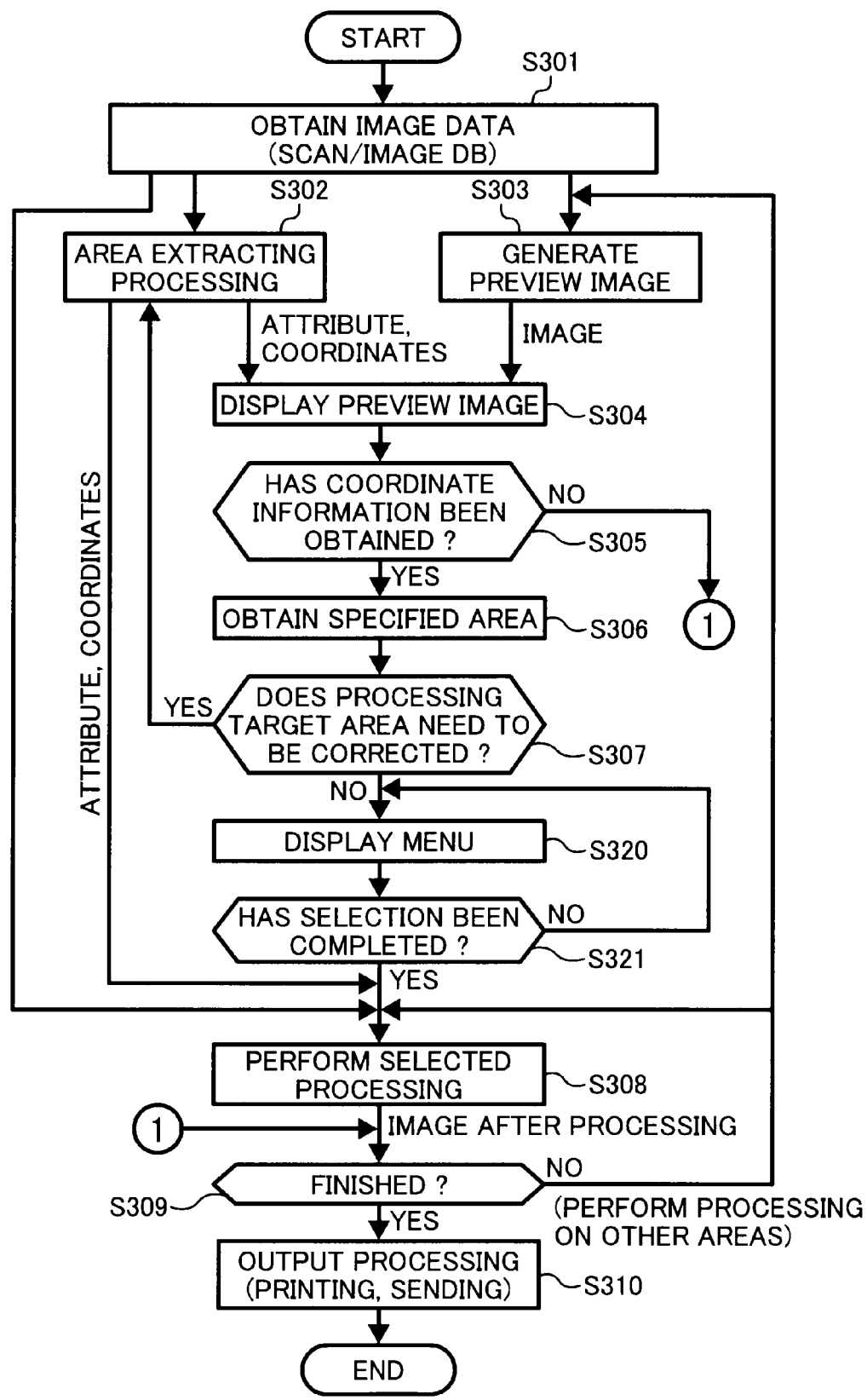
FIG. 16 is a flowchart of an image forming processing.

FIG. 16 is a flowchart of the image forming processing according to the third embodiment. As shown in FIG. 16, in the image forming processing, when image data input from the scanner 11 or image data stored in the image storing unit 12 is obtained (step S301), an area extracting processing for extracting a specified area (the attribute and the coordinates) in the image data is performed by the specified area extracting unit 22 (step S302; the image attribute extracting unit), and a preview image generating processing is performed by having the screen information generating unit 132 generate a preview image in which the resolution level is changed so that the preview image can be displayed on the display panel 15b (step S303; the preview image generating unit), and then the preview image in which the extracted specified area is indicated is displayed on the display panel 15b (step S304; the preview image displaying unit).

As explained above, when an operator touches the touch panel 15a and makes a touch input while the preview image is displayed on the display panel 15b, and if the coordinate information obtaining unit 131 obtains coordinate information (step S305: YES; the position information obtaining unit), it is checked if the obtained coordinate values are stored in the area table. When the obtained coordinate values are stored in the area table, the specified area is obtained as a processing target (step S306). If the coordinate information obtaining unit 131 obtains no coordinate information (step S305: NO), the procedure advances to step S309.

In this situation, when the processing that corresponds to the specified area being the processing target is a processing to correct the processing target area (step S307: YES), the procedure returns to step S302 and a specified area is extracted again. In this situation, for example, a re-extraction key (not shown) is assigned to the specified area.

Figure 17:
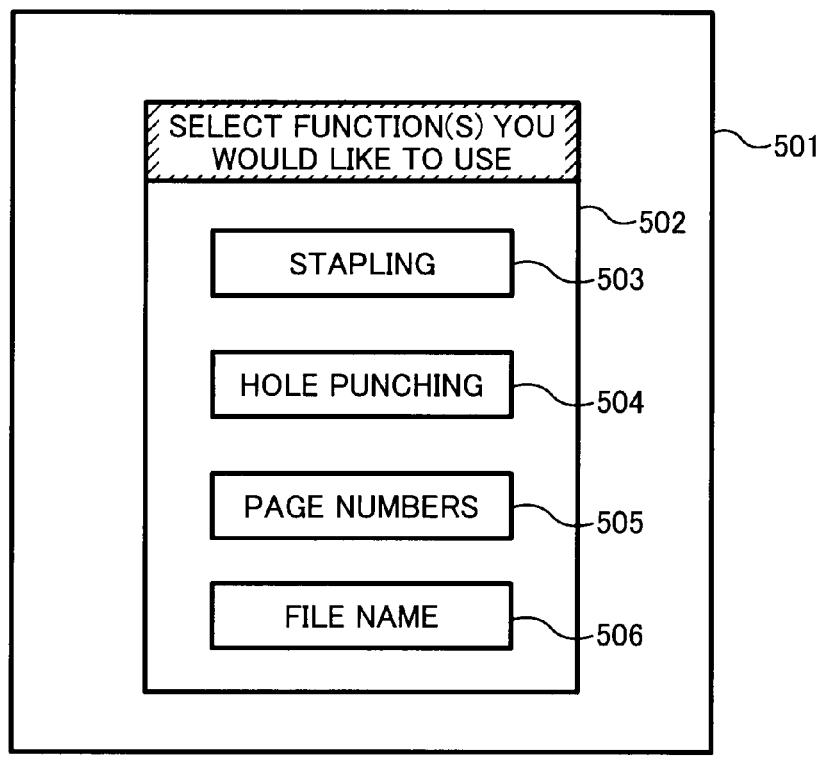
FIG. 17 is a schematic of processing item options displayed when a touch panel is touched by a user.

When the processing that corresponds to the specified area being the processing target is not a processing to correct the processing target area (step S307: No), the processing item setting unit 133 refers to the correspondence table 135a, and a menu showing options of processing items that correspond to the specified area are displayed on the display panel 15b and the menu with the options are put into a selectable state (step S320; the processing item notifying unit). FIG. 17 is a front view for showing an example in which processing item options are displayed as a result of a user's touching a touch panel. Within a display area 501 on the display panel 15b, four corresponding processing items, namely stapling 503, hole punching 504, page numbers 505, and file name 506, are displayed in a menu 502 showing the processing item options. For example, when wishing to set a stapling process, an operator inputs a setting by touching the "stapling" 503 with a pointer like a finger. As a result of the touching, a setting is made to have the stapling process performed, and a display image showing a state after the stapling process has been performed is generated by the screen information generating unit 132 and displayed on the display panel 15b.

When the selection of the processing item is completed (step S321: YES; the processing item selecting unit), the processing that is in correspondence with the specified area and has been selected at step S321 is performed on the image data (step S308; the processing performing unit).

At step S309 that follows, it is judged whether the processing should be finished, based on a predetermined key input. An example of when the judgment result will be "NO" is when it is desired that, in one sheet of original document, different types of processing are performed on different specified areas, or when specified areas cannot be specified all at once for one type of processing. When the judgment result is in the negative (step S309: NO), the image after the processing (for example, an image showing a stapled document or a document having punch holes) is used in the preview image generation process (step S303). In addition, because the image after the processing is also the processing target image, it is used when the processing at step S308 is performed as well.

On the other hand, when it is judged that the processing should be finished (step S309: YES), an output processing is performed by having the printer 14 perform the printing process and having the finish-up processing unit 141 perform the finish-up processing (step S310).

Figure 18:
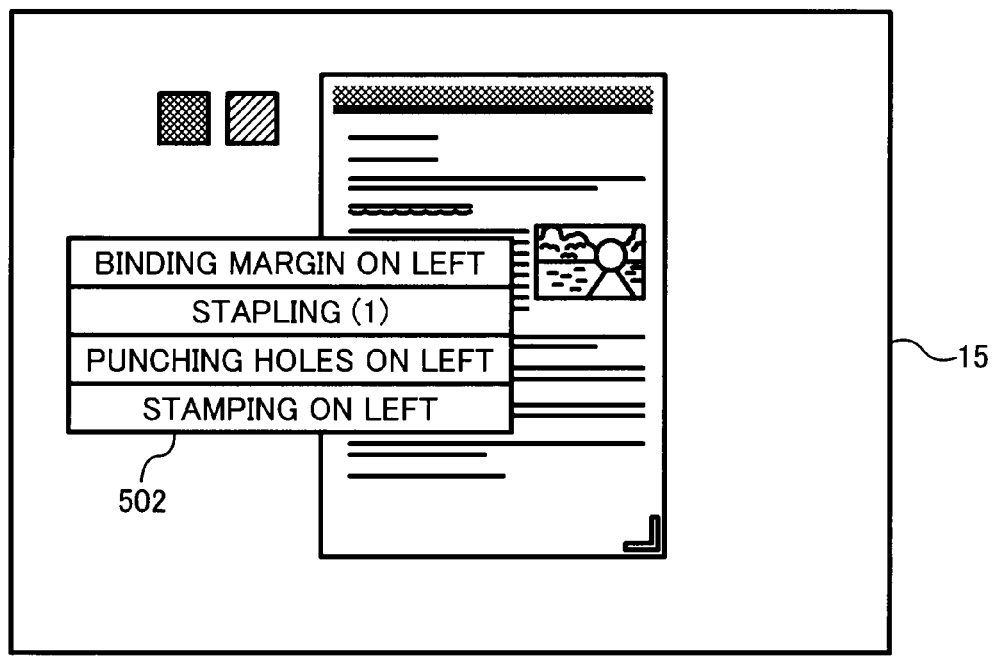
FIG. 18 is a schematic of a display screen at a time of making a setting for stapling.
Figure 19:
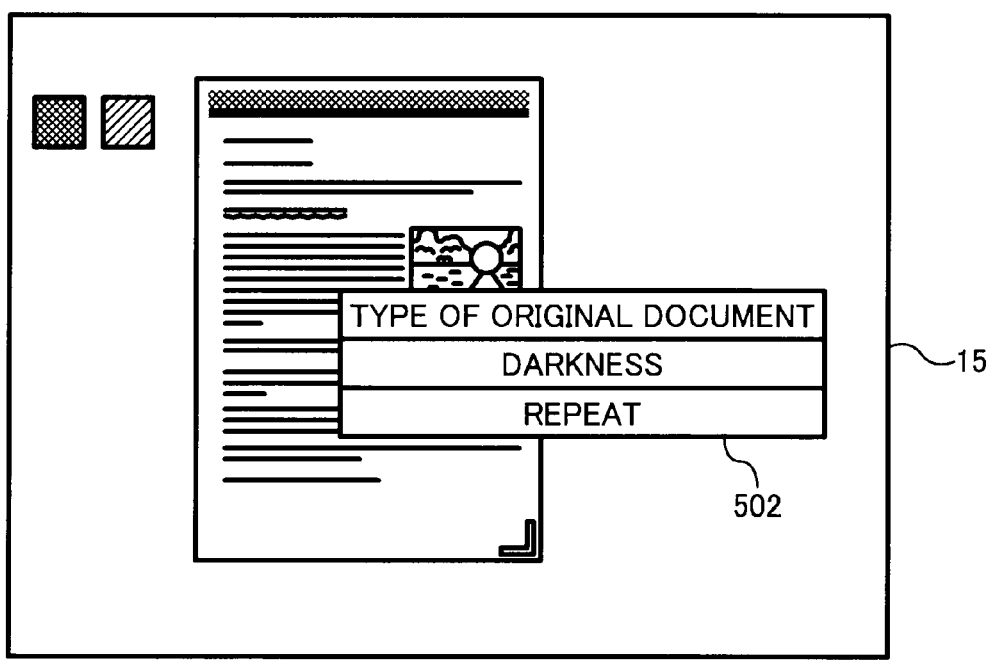
FIG. 19 is a schematic of a display screen at the time of making a setting for type of an original document.
Figure 20:
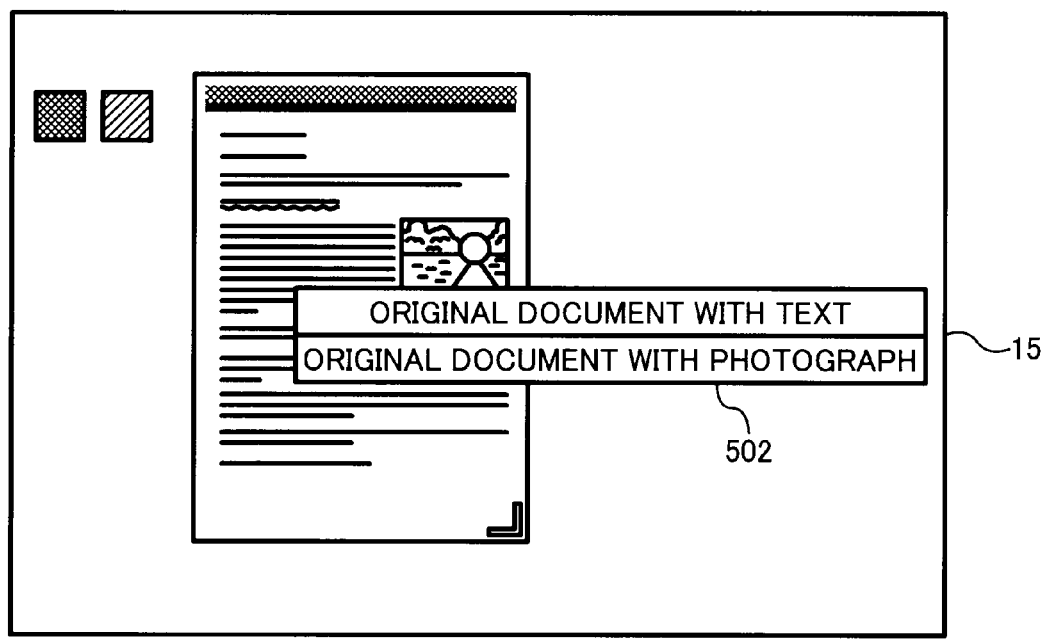
FIG. 20 is a schematic of a display screen at the time of making a setting for type of an original document.
Figure 21:
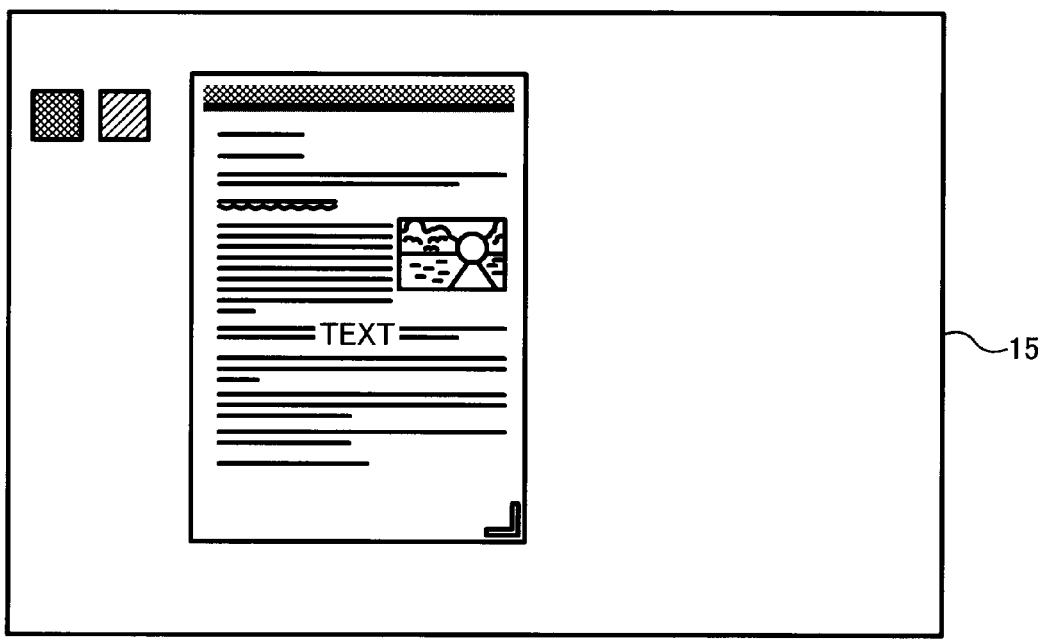
FIG. 21 is a schematic of a display screen after the setting for type of an original document is made.

Next, specific examples of the processing that corresponds to the specified areas will be explained.
(1) Setting for the Stapling Process When a user touches a page margin area (for example, the left end of an original document image) at a position where stapling can be performed, the menu 502 showing processing item options as shown in FIG. 18 will be displayed. When the "stapling" is selected, the screen display will be the one as shown in FIG. 8, and two stapling positions on the left of the copy are set. As for canceling the setting for the stapling process, when the user touches the staple marks "a" (cf. FIG. 8), a menu for canceling the setting will be displayed. When "cancel stapling" is selected, the setting will be cancelled.
(2) Type of the Document There are three types of document, namely, "text" "photograph", and "text and photograph". After an original document is scanned, the application automatically detects and makes a setting for the type of the original document. If a user wishes to change the type of original documents, when the user touches the content portion of the original document being displayed, the menu 502 showing the processing item options are displayed, as shown in FIG. 19. When the user selects "type of original document", the menu 502 showing processing item options related to the "type of original document" is displayed, as shown in FIG. 20. When the user selects "original document with text", the display shows a sign that says "text" in red, as shown in FIG. 21.

As explained so far, according to the third embodiment, the image attribute of the image data is extracted and also, a preview image generated from the image data is displayed. Then, the predetermined position information with respect to the displayed preview image is obtained, and a processing that corresponds to the image attribute related to the obtained position information is performed on the image data. With this arrangement, it is possible to improve the efficiency of the setting operation related to various types of processing. Thus, an effect is achieved where a high level of convenience is accomplished.

Further, an arrangement is made in which, as the image attribute, an image characteristic amount based on image characteristic value of the image data is extracted, the processing item information for the image data corresponding to the image characteristic amount related to the obtained position information is notified in a selectable manner, and a selection is made from the options included in the notified processing item information. Then, a processing related to the option selected from the processing item information is performed. With this arrangement, the operator is able to improve the efficiency of the setting operation related to the various types of processing. Thus, an effect is achieved where a high level of convenience is accomplished.

In the first, the second, and the third embodiments, the examples in which a multifunction product called an MFP is used as the image processing apparatus is explained; however, the present invention is not limited to this example, and it is acceptable to use a personal computer as the image processing apparatus.

Other effects and modification examples of the present invention can be easily deduced by a person skilled in the art. Accordingly, modes of the present invention in a wider range are not limited by the detailed description and the exemplary embodiments that are explained and described above. Thus, it is possible to apply various modifications to the present invention without deviating from the spirit or the scope of the overall inventive concept defined by the claims and equivalents of the claims.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus, comprising:
    an attribute extracting unit configured to extract an image characteristic amount for each of a plurality of small areas formed by dividing image data of a document;
    a preview generating unit configured to generate, based on the image data, a preview image that shows how the document will look on an output page;
    a display unit configured to display the preview image and to allow an operator to specify a position of the preview image displayed thereon;
    a position-information obtaining unit configured to obtain position information indicative of the specified position in the preview image; and
    a processing unit configured to select, according to how many times the position is specified in a successive manner, a small area having an equal image characteristic amount with the small area corresponding to the specified position whose position information is obtained by the position-information obtaining unit, and to perform, on the selected small area, a process according to the image characteristic amount of the selected small area, wherein
        when the position is specified twice in a successive manner, the processing unit selects small areas having an equal image characteristic amount with the small area corresponding to the specified position and being connected,
        when the position is specified three times in a successive manner, the processing unit selects small areas within a predetermined distance from the specified area, the selected small areas having an equal image characteristic amount and not being connected, and
        when the position is specified four times in a successive manner, the processing unit selects the whole document.

2. The image processing apparatus according to claim 1, wherein
    the processing unit includes
        an item informing unit configured to inform, in a selectable manner, process items for the selected small area of the image data according to the image characteristic amount; and
        an item selecting unit configured to allow selection of a process item from among the process items, and
    the processing unit is configured to perform a process of the selected process item on the image data.

3. The image processing apparatus according to claim 2, wherein the attribute extracting unit is configured to determine a type of the image data based on an image characteristic value of the image data.

4. The image processing apparatus according to claim 2, further comprising:
    a storage unit configured to store therein a correspondence table in which the image characteristic amount is associated with the process items, wherein
    the item informing unit is configured to inform, in a selectable manner, process items associated with the image characteristic amount of the selected small area by referring to the correspondence table stored in the storage unit.

5. The image processing apparatus according to claim 1, wherein types of the specified areas include page margin area, contents area, text area, and photograph area.

6. A non-transitory computer-readable recording medium storing a computer program that, when executed by a computer, causes the computer to function as an image processing apparatus by performing a method, the method comprising:
    extracting an image characteristic amount for each of a plurality of small areas formed by dividing image data of a document;
    generating, based on the image data, a preview image that shows how the document will look on an output page;
    displaying the preview image and allowing an operator to specify a position of the preview image displayed;
    obtaining position information indicative of the specified position in the preview image of the document;
    selecting, according to how many times the position is specified in a successive manner, a small area having an equal image characteristic amount with the small area corresponding to the specified position whose position information is obtained by the obtaining position information, and performing, on the selected small area, a process according to the image characteristic amount of the selected small area, wherein when the position is specified twice in a successive manner, small areas having an equal image characteristic amount with the small area corresponding to the specified position and being connected are selected, when the position is specified three times in a successive manner, small areas within a predetermined distance from the specified area are selected, the selected small areas having an equal image characteristic amount and not being connected, and when the position is specified four times in a successive manner, the whole document is selected.

7. The computer-readable recording medium according to claim 6, further comprising:

informing, in a selectable manner, process items for the selected small area of the image data;

receiving selection of a process item from among the process items, wherein the informing includes informing the process items according to the image characteristic amount, and the performing includes performing a process of the selected process item on the image data.

8. The computer-readable recording medium according to claim 6, wherein types of the specified areas include page margin area, contents area, text area, and photograph area.

9. An image processing method, comprising:

extracting an image characteristic amount for each of a plurality of small areas formed by dividing image data of a document;

generating, based on the image data, a preview image that shows how the document will look on an output page;

displaying the preview image and allowing an operator to specify a position of the preview image displayed;

obtaining position information indicative of the specified position in the preview image of the document; and selecting, according to how many times the position is specified in a successive manner, a small area having an equal image characteristic amount with the small area corresponding to the specified position whose position information is obtained by the obtaining position information, and performing, on the selected small area, a process according to the image characteristic amount of the selected small area, wherein when the position is specified twice in a successive manner, small areas having an equal image characteristic amount with the small area corresponding to the specified position and being connected are selected, when the position is specified three times in a successive manner, small areas within a predetermined distance from the specified area are selected, the selected small areas having an equal image characteristic amount and not being connected, and when the position is specified four times in a successive manner, the whole document is selected.

10. The image processing method according to claim 9, further comprising:

informing, in a selectable manner, process items for the selected small area of the image data;

receiving selection of a process item from among the process items, wherein the informing includes informing the process items according to the image characteristic amount, and the performing includes performing a process of the selected process item on the image data.

11. The image processing method according to claim 10, wherein the extracting step includes extracting a type of the image data based on an image characteristic value of the image data.

12. The image processing method according to claim 11, wherein the image characteristic value used in the extracting is a member of one of a plurality of categories.

13. The image processing method according to claim 10, wherein the process items include at least one of stapling and hole punching.

14. The image processing method according to claim 9, wherein types of the specified areas include page margin area, contents area, text area, and photograph area.

* * * * *